United States Patent [19]

Farrand et al.

[11] Patent Number: 5,440,699
[45] Date of Patent: Aug. 8, 1995

[54] SYSTEM BY WHICH A REMOTE COMPUTER RECEIVES SCREEN IMAGES FROM AND TRANSMITS COMMANDS TO A HOST COMPUTER

[75] Inventors: Scott C. Farrand, Tomball; Patrick E. Dobyns, Garland; Thomas J. Hernandez, Houston; Ronald A. Neyland, Spring; Richard A. Stupek, Houston; Said S. Saadeh; Paul R. Fulton, both of Plano; Richard P. Mangold, Tomball; Andrew J. Miller, Houston, all of Tex.

[73] Assignee: Compaq Computer Corporation, Houston, Tex.

[21] Appl. No.: 282,824

[22] Filed: Jul. 29, 1994

Related U.S. Application Data

[63] Continuation of Ser. No. 719,243, Jun. 24, 1991, abandoned.

[51] Int. Cl.$^6$ .............................................. G06F 3/00
[52] U.S. Cl. ........................... 395/155; 364/DIG. 1; 364/227.1; 364/234; 395/500; 395/700; 395/200.03; 395/200.12
[58] Field of Search ........................ 360/222.1, 234; 395/700, 500, 325, 155

[56] References Cited

U.S. PATENT DOCUMENTS

| | | | |
|---|---|---|---|
| 3,585,601 | 6/1971 | Labeson | 364/200 |
| 3,889,062 | 6/1975 | Epstein | 177/2 DP |
| 4,356,545 | 10/1982 | West | 364/200 |
| 4,727,478 | 2/1988 | Endfield et al. | 364/200 |
| 4,823,343 | 4/1989 | Takahashi | 371/16 |
| 5,008,853 | 4/1991 | Bly et al. | 364/DIG. 2 |
| 5,072,412 | 12/1991 | Henderson, Jr. et al. | 395/159 |
| 5,220,657 | 6/1993 | Bly et al. | 395/425 |
| 5,233,687 | 8/1993 | Henderson, Jr. et al. | 395/158 |
| 5,337,407 | 8/1994 | Bates et al. | 395/153 |

FOREIGN PATENT DOCUMENTS

0370274A2  5/1990  European Pat. Off. .

OTHER PUBLICATIONS

IBM Technical Disclosure Bulletin, "Software Keyboard Simulation", vol. 30, No. 11, pp. 154–157, Apr. 1988.

IBM Technical Disclosure Bulletin, "Emulation of Personal Computer Displays on AIX Virtual Terminals", vol. 33, No. 3A, pp. 1–2, Aug. 1990.

Primary Examiner—Kevin A. Kriess
Assistant Examiner—J. Backenstose
Attorney, Agent, or Firm—Jenkens & Gilchrist

[57] ABSTRACT

A remote console emulation for a computer system manager operates by transferring video screen images from system memory to the remote console and by inserting keystrokes from the remote console into the system keyboard controller. This emulation constitutes a marked improvement over prior art emulations because it does not require software on the host system.

15 Claims, 4 Drawing Sheets

ND TRANSMITS COMMANDS TO A HOST
COMPUTER

This is a continuation of application Ser. No. 07/719,243, filed Jun. 24, 1991, now abandoned.

CROSS REFERENCE TO RELATED APPLICATIONS

This application is related to co-pending U.S. patent application Ser. Nos. 07/720,259, abandoned, continuation U.S. Pat. No. 08/192,072, now U.S. Pat. No. 5,367,670, entitled "Computer System Manager For Monitoring Events And Operating Parameters And Generating Alerts" U.S. Pat. No. 07/719,240, abandoned, continuation U.S. Pat. No. 08/157,335, now U.S. Pat. No. 5,402,431, entitled INNATE BUS MONITOR FOR COMPUTER SYSTEM MANAGER, U.S. Pat. No. 07/720,258, abandoned, continuation as U.S. Pat No. 08/250,651 entitled IN-BAND/OUT-OF-BAND ALERT DELIVERY SYSTEM, and Ser. No. 07/719,394, now U.S. Pat. No. 5,283,905, entitled POWER SUPPLY FOR COMPUTER SYSTEM MANAGER, all of which were filed on even date herewith, assigned to the assignee of the present invention and hereby incorporated by reference as if reproduced in their entirety.

BACKGROUND OF THE INVENTION

Field of the Invention

The present invention relates to emulation systems more particularly, to remote console emulation systems.

DESCRIPTION OF RELATED ART

Emulation is well known to those skilled in the computer arts as the imitation of all or part of one computer system by another so that, for example, the imitating computer system accepts the same data, executes the same programs, and achieves the same results as the imitated system.

Emulation has heretofore been used with respect to consoles. That is, secondary or remote consoles have been added to host systems and have been caused to operate via emulation of the host's primary console. Via such mechanisms, increased control over host systems can be exercised with relative efficiency and ease.

Prior art remote console emulators have a number of shortcomings however. Such emulators all require at least some software running in the host system in order to operate. This software must be appropriately tailored for the individual host with which it is to be used, which increases complexity and cost of development and installation, and decreases host performance. Additionally, because host running software is required for such emulations, if the host fails, the emulation fails also. It is, therefore, a shortcoming and deficiency of the prior art that remote console emulations have heretofore not operated independently of the host system, while still efficiently and easily increasing the level of control over the host system.

SUMMARY OF THE INVENTION

The present invention overcomes the shortcomings and deficiencies of the prior art by providing a remote console emulation for a computer system manager that operates by transferring video images from system memory to the remote console and by inserting keystrokes from the remote console into the system keyboard controller. This emulation constitutes a marked improvement over prior art emulations because it does not require software on the host system.

Accordingly, it is an object of the present invention to provide a simple, but effective, remote console emulation for a computer system manager.

Another object of the present invention is to provide a remote console emulation that does not require any software on the host system.

BRIEF DESCRIPTION OF THE DRAWINGS

The invention may be better understood and its numerous objects, features and advantages become apparent to those skilled in the art by referencing the accompanying drawings in which.

DETAILED DESCRIPTION OF A PREFERRED EMBODIMENT

Figure 1:
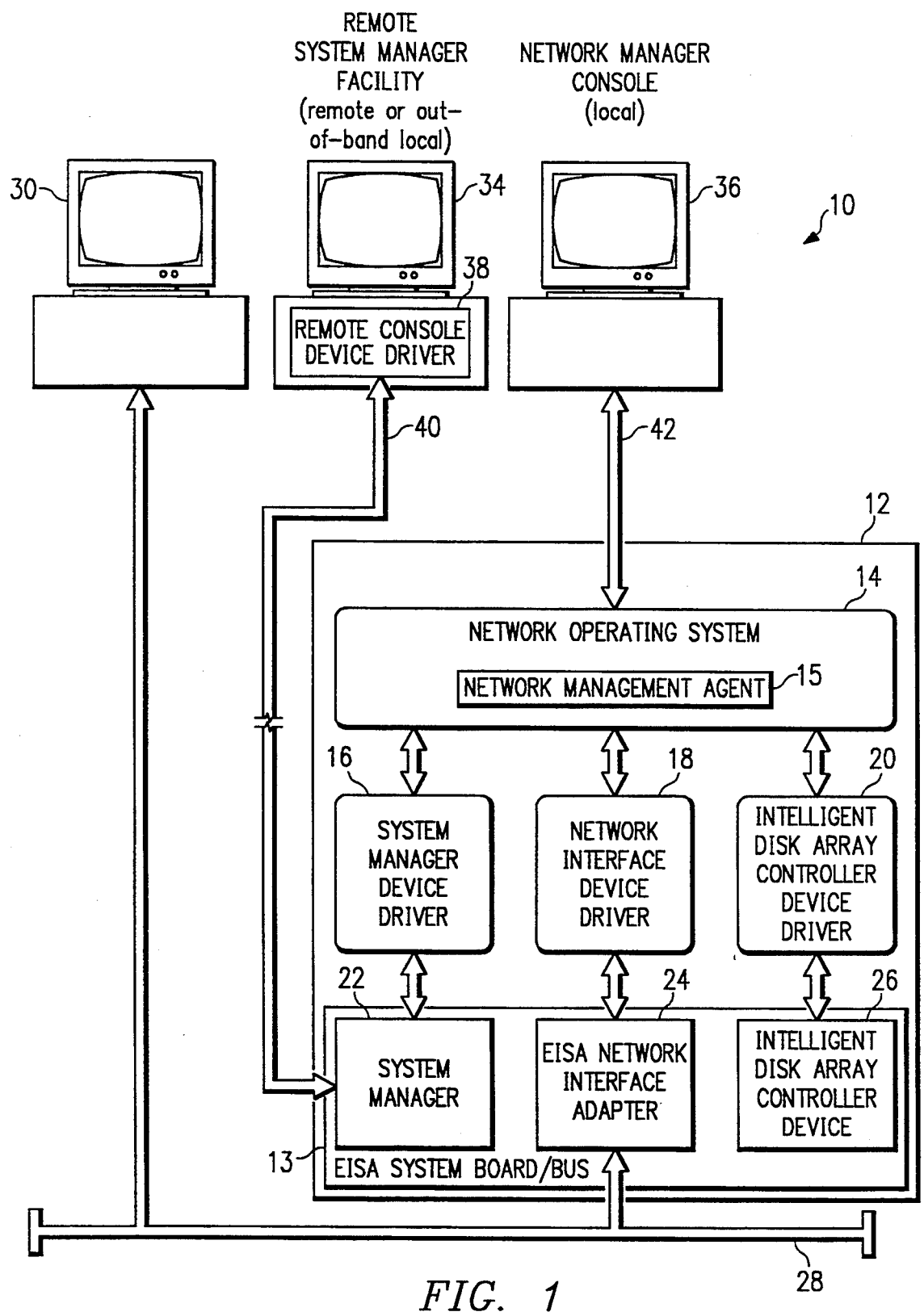
FIG. 1 is a block diagram of a computer network having an EISA based computer system and a computer system manager installed therein.

Referring first to FIG. 1, an extended industry standard architecture (or "EISA") based computer network 10 having a system manager 22 shall now be described in detail. The computer network 10, which may be configured as either a LAN, WAN, or other type of network configuration, includes an EISA server 12 having an EISA system board/bus 13. It should be noted that the EISA system board and EISA system bus are, in reality, distinct structures. However, for ease of illustration they are shown in FIG. 1 as a unified element. Henceforth, to facilitate understanding, references to element 13 shall specifically indicate which portion of the unified element is being considered.

Installed on the EISA system board 13 are a plurality of cards including a system manager 22, an EISA network interface adapter 24, and an intelligent disk array controller device 26. Also running on the EISA server 12 is a network operating system 14, which is shown to include a network management agent 15.

Interconnecting the system manager 22 and the network management agent 15 is a system manager device driver 16. The system manager device driver 16 acts as a hi-directional translator for all requests to and from the system manager 22, thereby providing two-way communication between the system manager 22 and the network management agent 15. Through this interconnection between the system manager 22 and the network management agent 15, the network manager 15 may store information in, or receive information collected by, the system manager 22. Object management by the system manager 22 may, therefore, be performed by the network management agent 15 by issuing instructions to create, modify, reset, or clear objects stored in the system manager 22.

The network management agent 15 also operates as a central collection point for the EISA server's network management information by acting as a link between the system manager 22 and other cards installed on the EISA system board 13 and the host computer network More specifically, also installed on the EISA system board 13 in the network shown in FIG. 1 are an EISA network interface adapter 24 and an intelligent disk array controller device 26. The network operating system 14 connects the EISA system board. 13 and, via network interface device drive 18 which operates in a manner similar to the system manager device driver 16, the network interface adapter 24 for two-way data transmission therebetween. Furthermore, as the network interface adapter 24 is connected for two-way data transmission with the network 28, a two-way communication link between the system manager 22 and the network 28 is thusly provided. The network 28 is the interface of the network component via the network media. The network 28 may be configured in a Token Ring, Ethernet or other network topology in use today, to control the access of multiple computer stations to the network 28, although, in the embodiment of the invention described and illustrated herein, a single computer station 30 has been provided.

An intelligent disk array controller device driver 20 which, like the network interface device driver 18, operates in a manner similar to the system manager device driver 16, provides for two-way data transmission between the system manager 22 and, via the network operating system, the intelligent disk array controller device 26. The intelligent disk array controller device 26 provides disk storage for the EISA system board 13.

Also shown in FIG. 1 are a local network manager console 36 and a remote system manager console 34. The local network manager console 36 is connected to the network operating system 14 by an in-band network 42. The remote system manager console 34, with an associated remote console device driver 38, is connected to the system manager 22 by an out-of-band, asynchronous line 40.

Figure 2:
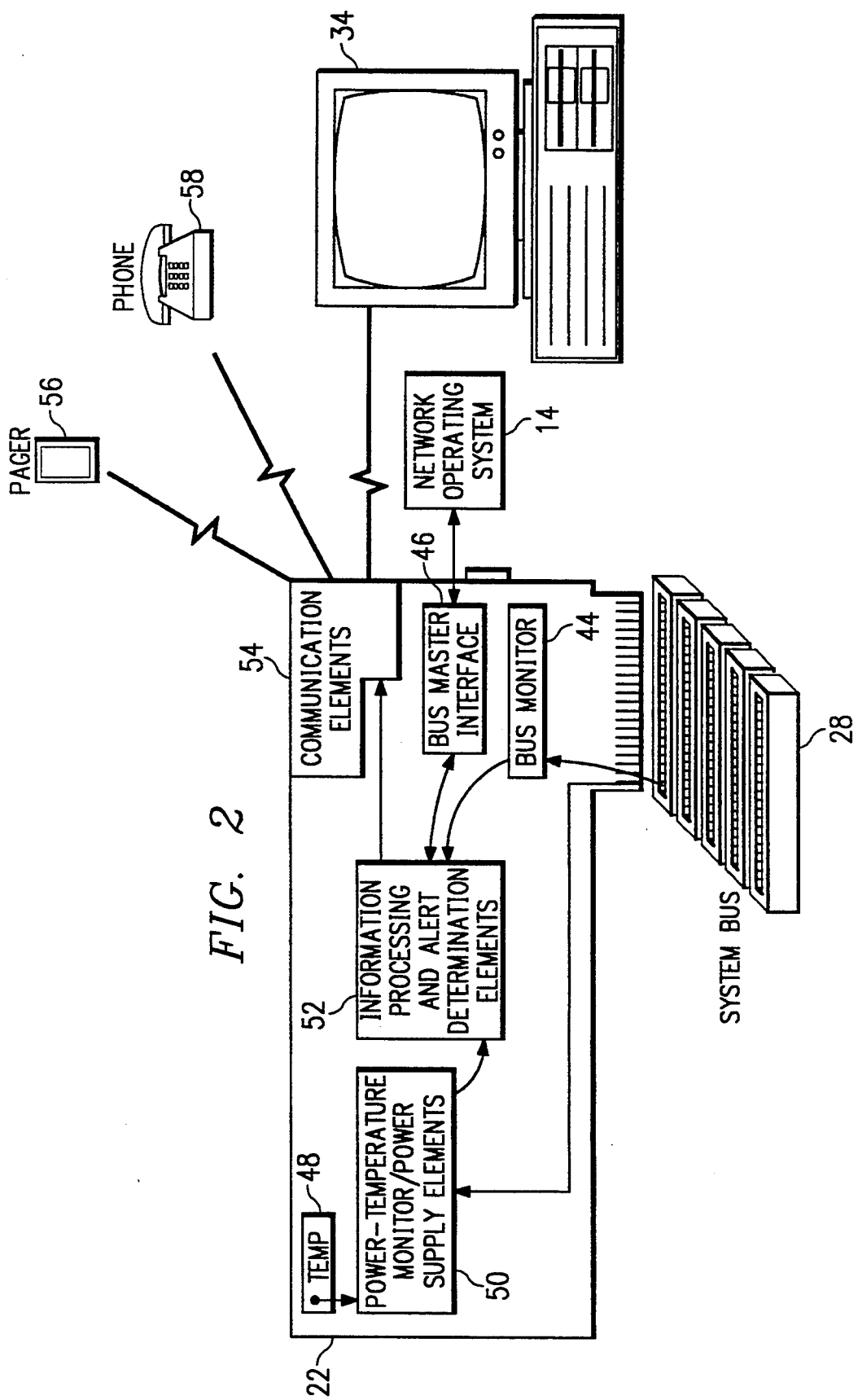
FIG. 2 is a block diagram of the system manager of FIG. 1 which illustrates information flow to and from, as well as within, the system manager.

Referring next to FIG. 2, the flow of data and alerts within the system manager shall now be briefly described. As discussed in detail in other of the related cases, the system manager 22 has the ability to monitor system components and parameters. If a component experiences a failure or exhibits characteristics that indicate it may experience a failure, the system manager detects the failure or characteristic indicative of a potential failure and reports it to a system administrator so that corrective action can be taken.

As may be seen in FIG. 2, data which may be utilized to monitor system components and/or parameters indicative of potential failures may be supplied to the system manager 22 along four paths. First, the EISA bus 28 supplies certain signals to a bus monitor 44 which help determine the state of the system. These signals are then transferred to processor and supporting logic 52 where determination of alert conditions are determined. If an alert condition is determined by the processor and supporting logic 52, an alert condition is issued to communication element 54 where an alert is issued. Asynchronous or out-of-band alerts may be delivered to the system monitor 34, a pager 56 or to a phone 58.

Other signals for which alert conditions may be determined may be delivered to the processor and supporting logic 52 by alternate paths. For example, system temperate is monitored by a temperature monitor 48 and transmitted to power/supply elements 50 where analog to digital conversion of the temperature data is delivered. Also transmitted to the power/supply elements 50 are certain power signals which indicate whether the system manager is receiving power from the EISA bus 28. These signals are transmitted to the processor and supporting logic 52 for determination of alert conditions as well.

Finally, a bus master interface 46 is used to transfer certain signals from the network management system to the processor and supporting logic 52.

According to the teachings of the present invention, through the link between the communications elements 54 of the system manager 22 and the remote console 34, significant control of the system manager 22 can be performed from a remote location From the remote console 34, remote console emulation, access to stored data and remote control or "rebooting" may be performed. Remote console emulation or "hard key insertion" permits keystrokes at the remote console to be delivered to the system manager 22 as if they were input locally. Through the hard key insertion, "soft" reboots are emulated by simultaneously inserting "control"—'-'alt"—"del" to actuate a reboot of the system manager 22. While not being able to actuate a complete "hard" reboot, the remote console 34 can simulate a hard reboot by selectively removing power from system components. Further details regarding remote console emulation are set forth herein below.

Figure 3:
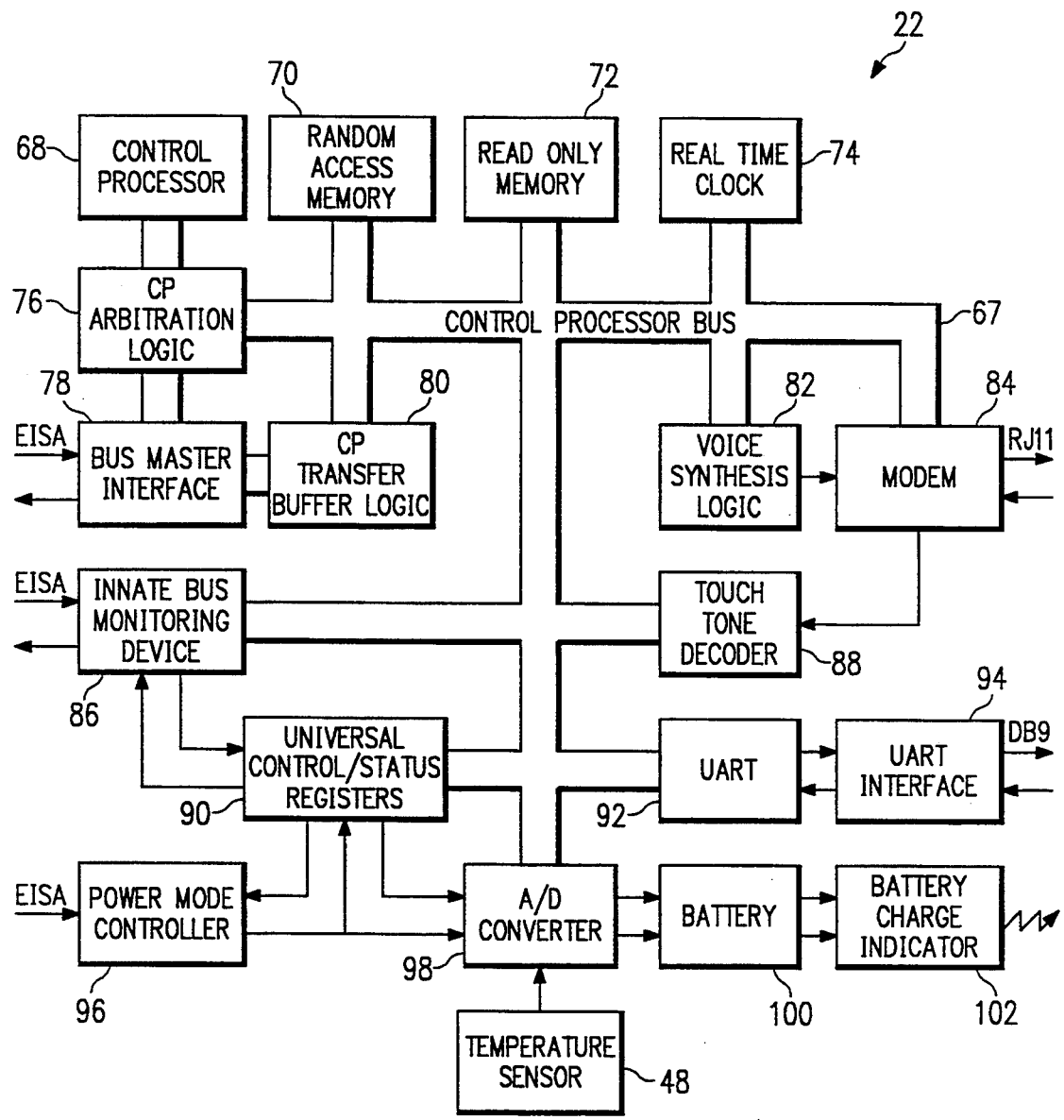
FIG. 3 is a low level block diagram of the system manager of FIGS. 1 and 2.

Referring next to FIG. 3, the structural configuration of the system manager 22 shall now be described in greater detail. The system manager 22 is comprised of a bidirectional control processor bus 67 and a series of system manager components connected to the control processor bus 67 for the transfer of address, data and control signals between various components of the system manager 22. Connected to the control processor bus 67 are a control processor 68, random access memory 60, read only memory 72, a real time clock 74, control process or arbitration logic 76, a bus master interface 78, control processor transfer buffer logic 80, voice synthesis logic 82, a modem 84, a host bus monitor 86, a touch tone decoder 88, universal control/status registers 90, a universal asynchronous receiver transmitter (or "UART") 92, a UART interface 94, a power mode controller 96, an analog-to-digital converter 98; and indirectly a battery 100 and a battery charge indicator 102.

Because the related cases are filled with details regarding the structure and operation of the system manager 22, only those details shown in FIG. 3 that are directly pertinent to the present invention shall be discussed herein. Recognizing that the present invention involves emulation of the local console 36 by the remote console 34 (see FIG. 1), the system manager 22 is disposed between those two consoles 36, 34 with the local console 36 interfacing with the bus master interface portion 78 of the system manager 22, and with the remote console 34 interfacing with the modem 78 or UART portions 92, 94 of the system manager 22. The system manager's local memory 70, 72, which is connected to the control processor bus 67, also plays a role in transfer of video signals in embodiments of the present invention as is discussed further below. Additionally, logic 76, 80 within the system manager 22 that is associated with the bus master interface 78 allows for bus master input/output transfers within the overall data communications network This is significant because, as is discussed further below, transfer of video and keystroke signals are effected by bus master I/O transfers in embodiments of the present invention.

Figure 4:
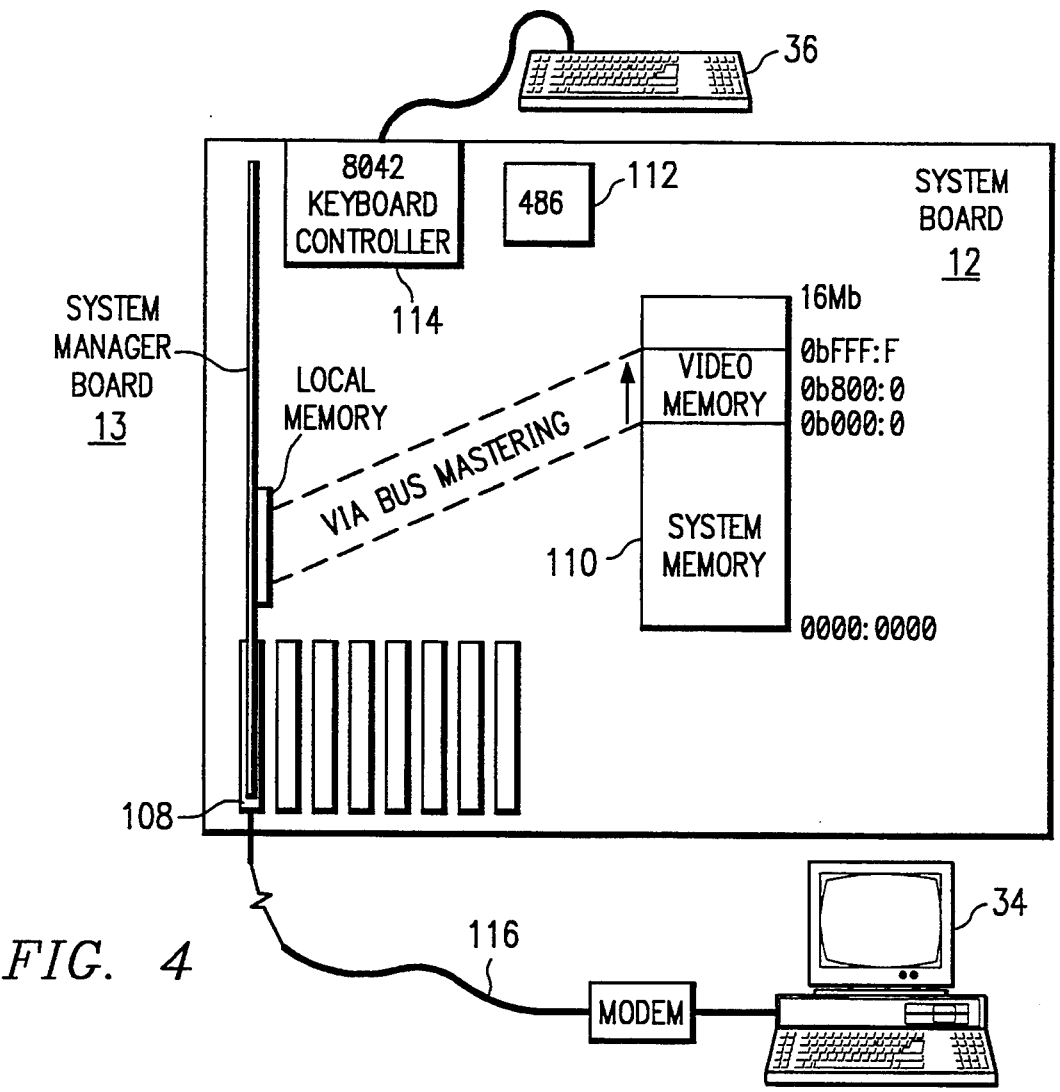
FIG. 4 is a partial block diagram of components in an embodiment of the present invention.

Referring next to FIG. 4, there is shown a partial block diagram of components in an embodiment of the present invention. Specifically, shown in FIG. 4 is the remote console 34 which is to effect emulation of the local network manager console 36 (only the keyboard of which is shown in FIG. 4).

Mechanically, an EISA system board 13 is inserted into one of the bus master EISA bus slots 108 on the overall system board 12. As is well known to those skilled in the art, the system board comprises, in additional to the bus slots, a system memory 110, a CPU 112, and a keyboard controller 114. The memory 110, CPU 112, and controller 114 are all conventional, and are all connected in a conventional manner.

Embodiments of the present invention effect remote console emulation by performing at least two steps. One of the steps is transferring video signals as are displayed on console 36 to console 34. The other step is to insert keystrokes from the console 34 into the keyboard controller 114 as if those keystrokes had originated at the keyboard of console 36. These two steps are discussed immediately below.

With respect to transfer of video signals, in an embodiment of the present invention video signals are transferred from the video memory portion of the system memory 110 via bus mastering. These video signals are transferred screen by screen. In board 113 subsequent "screens" are compared to immediately preceding screens and the determined differences are compressed and sent over the asynchronous line 116 to the remote console 34. By this mechanism in embodiments of the present invention may effect emulation or reproduction of screen images at a remote console application.

Figure 5:
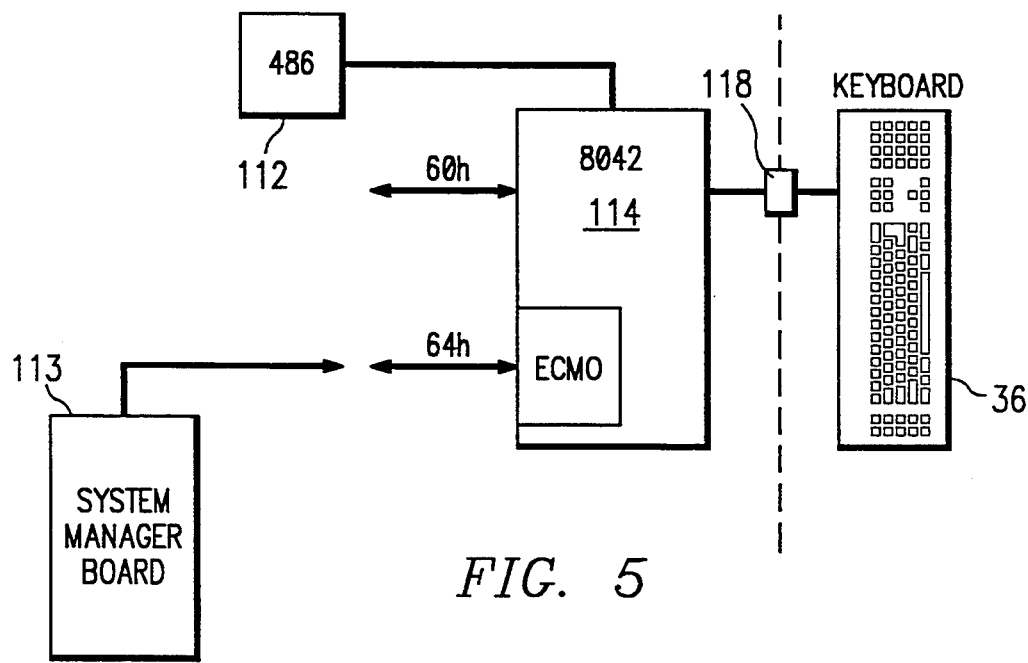
FIG. 5 is a block diagram illustrating keystroke insertion in an embodiment of the present invention.

With respect to transfer of keystrokes, reference should now be made to FIG. 5. FIG. 5 shows keyboard 36 interconnected to the conventional keyboard controller 114 via a conventional serial port 118. In normal practice, as is well know to those skilled in the art, keystrokes from keyboard 36 are directly transmitted to the; controller 114 wherein they may be accessed and used by the host CPU 112. The present invention inserts keystrokes into the above chain by taking over the system bus and issuing separate commands by doing a bus master I/O transfer. More specifically, in embodiments of the present invention the board 113 issues an echo command which indicates a simulated keystroke follows. By this mechanism, the board 113 effectively "tricks" the host system into thinking keystrokes from board 113 (and, of course, ultimately from the remote console 34, which sends those keystrokes to be simulated to the board 113 over the asynchronous line 116) came from the local console keyboard 36.

Those skilled in the art should appreciate how the present invention effects remote console emulation. Those skilled in the art should further appreciate that emulation as taught herein constitutes a marked improvement over prior art methods, particularly because it does not require software on the host system, but also generally because of the simple, straightforward, but yet effective manner in which it operates.

Those skilled in the art will recognize that many modifications and variations besides those specifically mentioned may be made in the techniques described herein without departing substantially from the concept of the present invention. For example, a security mechanism can be built into the present invention using the touchtone decoder component 88 shown in FIG. 3. Further details regarding inclusion of such a mechanism may be found in the related cases incorporated herein Accordingly, it should be clearly understood that the form of the invention as described herein is exemplary only and is not intended as a limitation on the scope of the invention.

What is claimed is:

1. In a computer network having at least one computer system operatable therein, said computer system having a plurality of components interconnected by a system bus for transferring information between said components, said computer system further having a local console, a remote console, and a system by which said remote console emulates said local console, said system comprising:
   a system memory having a video memory portion in which screen images of said local console are stored, said system memory disposed within said local console;
   means for transferring screen images from said system memory in said local console to said remote console thereby emulating the local console screen images at said remote console simultaneously with said local console;
   a keystroke controller connected to said local console so as to receive keystroke signals therefrom, said keyboard controller allowing a local keyboard and a remote keyboard to be operated simultaneously; and
   means for inserting keystrokes from said remote console into said keystroke controller, thereby emulating the local console keyboard, said local console being emulated at said remote console without the use of additional software in said local console.

2. A system as recited in claim 1, wherein said means for transferring comprises a computer system manager.

3. A system as recited in claim 2, wherein said means for inserting also comprises said computer system manager.

4. A system as recited in claim 3, wherein said computer system manager and said remote console are interconnected by an asynchronous line.

5. A system as recited in claim 1, wherein said means for transferring consists of hardware.

6. A system as recited in claim 1, wherein said means for transferring consists of hardware and firmware.

7. A system as recited in claim 1, wherein said means for inserting consists of hardware.

8. A system as recited in claim 1, wherein said means for inserting consists of hardware and firmware.

9. A system according to claim 1, wherein said local console and said remote console can effectively communicate with said computer system.

10. A system by which a personal computer having a monitor and a keyboard can emulate a host computer to which it is connected, said system comprising:
    means for displaying host system output on said monitor of said personal computer simultaneously with a monitor of said host system, said means for displaying comprising:
    memory disposed within said host computer where host computer screen images are stored, and
    means for transmitting said screen images to said monitor of said personal computer; and
    means for receiving keyboard input from said personal computer simultaneously with input from said host computer, said means for receiving disposed within said host computer, said means for receiving comprising:

a keyboard controller disposed within said host computer, and means for transmitting keystrokes from said keyboard of said personal computer to said keyboard controller, whereby input may be sent from said personal computer to said host computer and output may be sent from said host computer to said personal computer without requiring use of software run on said host computer.

11. A system as recited in claim 10, wherein said means for displaying consists of hardware.

12. A system as recited in claim 10, wherein said means for displaying consists of hardware and firmware.

13. A system as recited in claim 10, wherein said means for receiving consists of hardware.

14. A system as recited in claim 10, wherein said means for receiving comprises hardware and firmware.

15. A system according to claim 10, wherein both a first operator at said host computer and a second operator at said personal computer can effectively communicate with said host computer.

* * * * *